(No Model.)
E. THOMSON.
ELECTRIC MEASURING INSTRUMENT.
No. 537,499. Patented Apr. 16, 1895.
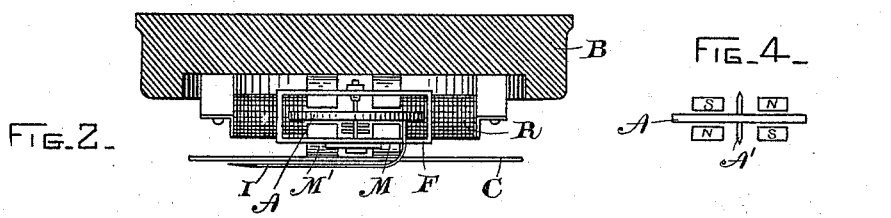
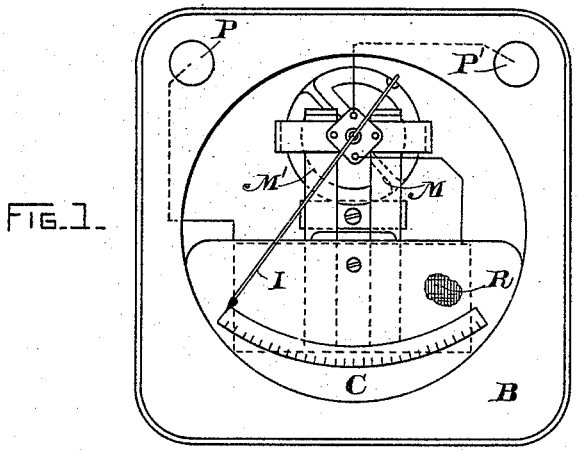
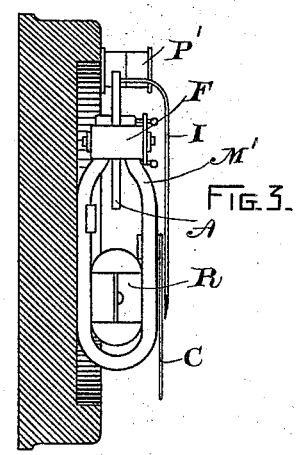
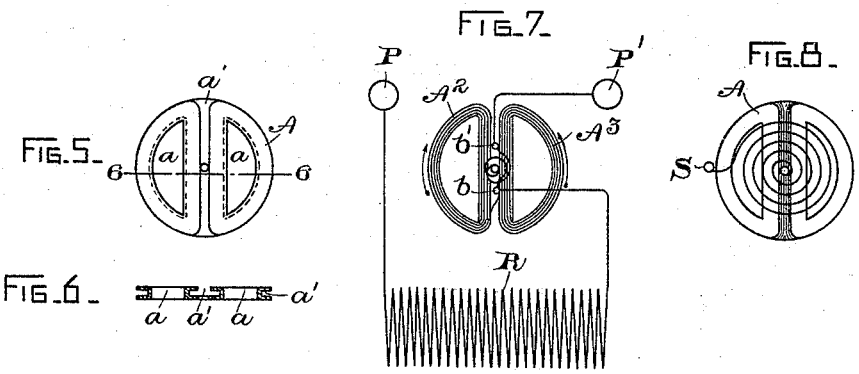
WITNESSES.
A. F. Macdonald.
B. B. Hull.
INVENTOR.
Elihu Thomson, by
Geo. R. Blodgett,
Atty.
THE NORRIS PETERS CO., PHOTO-LITHO., WASHINGTON, D. C.

UNITED STATES PATENT OFFICE.

ELIHU THOMSON, OF SWAMPSCOTT, ASSIGNOR TO THE THOMSON-HOUSTON ELECTRIC COMPANY, OF BOSTON, MASSACHUSETTS.

ELECTRIC MEASURING-INSTRUMENT.

SPECIFICATION forming part of Letters Patent No. 537,499, dated April 16, 1895.

Application filed October 26, 1894. Serial No. 527,081. (No model.)

*To all whom it may concern:*

Be it known that I, ELIHU THOMSON, a citizen of the United States, residing at Swampscott, in the county of Essex and Commonwealth of Massachusetts, have invented certain new and useful Improvements in Electric Measuring-Instruments, of which the following is a specification.

My invention relates to electric measuring instruments, and has for its object to provide a simple and cheap construction for such instruments, one easily and cheaply made, capable of being made as sensitive as may be required, and operating upon the so-called "astatic" principle; for which reason it is peculiarly adapted to central station requirements, where it may be located upon the switchboard with other instruments and not be disturbed in its indications by stray magnetic fields, such as those set up by the conductors upon the switch-board when heavy currents are passing.

It consists further in a simplification of the parts of such instruments, obviating some of the defects of existing appliances, and in the peculiar combination of parts hereinafter more fully described, and the novelty of which is set out in the claims.

The accompanying drawings show embodiments of my invention, Figure 1 being a front elevation; Fig. 2, a plan with the supporting base also in section. Fig. 3 is a side elevation with the supporting base also in section. Figs. 4, 5, 6, 9, and 10 show various details. Fig. 7 is a diagram of the circuits, and Fig. 8 is a modification adapted more especially to portable instruments.

I have illustrated and described my improved measuring instrument as a voltmeter or instrument applied to the measuring of potential; but in my pending application of even date herewith, bearing Serial No. 527,082, I have illustrated and described an ammeter constructed upon the same principles, with such modifications as are necessary. I do not mean, however, to exclude from the scope of the claim of this application instruments constructed upon the same principles as the one here illustrated, and designed for the measuring of current.

Referring now by letter, in Figs. 1, 2 and 3, the base B of any suitable material, carries the working parts of the instrument, which consist in the first place of a pair of permanent magnets, M M', suitably secured in position. The form of each magnet is best seen in Fig. 3. The poles are closely approximated and are clamped in position by a yoke F, preferably of non-magnetic material, such as brass or copper. The poles of the two magnets are alternated in position; that is to say, the south pole of one and the north pole of the other are nearest the base of the instrument, the arrangement being shown in end view in Fig. 4, where the letters N, S, &c., designate the polarity of the magnets as they are seen. This particular arrangement is of importance, inasmuch as it compensates for the effect of outside or stray magnetic fields, and will be referred to hereinafter.

Pivoted upon an axis A' is seen, between the two magnets, a centered disk-like bobbin or carrier, marked A in drawings. This structure consists of a central shaft mounted in jewels carried in the frame F, which frame surrounds the poles of the magnets, one end of the shaft being shown in Fig. 9 illustrating the form of bearing. In a plane at right angles to the shaft there is carried a disk or set of bobbins or coil supports. This disk or support is preferably made of good conducting material like copper. It serves as a support for a pair of coils which, as shown, are wound in approximately the shape of semi-circles. These are flat coils and the shape or contour of the coils could be modified without greatly affecting the action provided that the general direction of the wire between the magnet poles is maintained. The coils will, of course, lie in the same plane, and their straight sides where they approximate near the axis have the current carried through them in the same direction. This is shown in Fig. 7. The coils would be made of comparatively fine wire, and for measuring volts would be put in circuit with a high resistance coil and connected across the mains the potential difference of which is to be measured.

The coil carrier A is preferably composed of a plate, disk, or form of copper, having projections which sustain the wire-wound coils. This gives a damping action in the magnetic field which prevents too persistent oscillation in coming to any point on the scale.

I have illustrated very fine wire in the construction of the instrument, as this is best adapted for voltmeters. The supporting axle of the disk-like structure or wheel A passes betweel the coils at the place where they approximate most closely, the current flowing in the same direction in the wire of these parts of the two coils; and the wheel carrying the coils is so adjusted in weight as to bring the index I, Fig. 1, to the zero of the scale C when the instrument is vertical. In this case deflections are due to the magnetic forces overcoming the tendency of gravity to keep the instrument at zero. This loading, or adjusting of weight, may, however, be omitted, and the modification shown in Fig. 8 may be adopted, wherein the spiral spring S is used to bring the instrument to zero, and the deflections of the instrument are dependent on the differences between the force of the magnetic field tending to move the index I, and the retaining tendency of the spring S, this form being the best for portable instruments.

While I have illustrated and described two coils, it is manifest that a single coil may be used having the shape of either of the coils here shown if the wire be similarly related to the field of both magnets, but I prefer the form illustrated, as it gives a better balance.

In Fig. 7 I show the circuit of the instrument as arranged for potential indications, and it will be seen that it includes a high resistance, R. For proper indications the resistance of the coils $A^2 A^3$ may be only a portion of that included in the circuit of the instrument, and the resistance R being adjustable in amount, may be used as a means of calibrating the indications in ways well understood.

Figs. 9 and 10 show the means I adopt of taking the current to the movable coils. On the shaft carrying these coils and the bobbin or wheel A are mounted two small sleeves insulated from the shaft and from each other, and to which the terminals of the coils are respectively attached. Fixed to these sleeves, one to each, are two delicate spirals of silver foil, which are made with such small elasticity that they have practically no effect in determining the position of the movable coils or influencing the position of the index; but they have sufficient conductivity to convey the small current necessary to operate the instrument.

Binding posts P P' for connecting the instrument to the outside circuit are provided as indicated in Figs. 1 and 7. The current starting at the post P, first passes through the high resistance R, preferably made of some metal with low temperature coefficient, to the silver strip $b$ connecting with one terminal of the coil $A^2$, thence through the coil $A^3$, thence by the silver strip $b'$ and out at the other post P'.

It is obvious that I may arrange the resistance upon each side of the coils, and that the instrument would operate equally well. I also prefer to wind the coils of fine copper wire with as many turns as possible, according to the sensitiveness desired.

The operation of the instrument will be readily deduced from the foregoing description.

By reference to Fig. 1 it will be seen that when the index is at zero the straight portions of the coils $A^2 A^3$ make an angle with the horizontal, and the areas inclosed by the coils do not coincide with the air gap between the poles of the magnets. Under this condition the current makes the upper part of the coil-carrying structure A rotate to the left, thus carrying the index I over the scale from left to right; this rotation causing the wire in the straight portion of the bar to cut the magnetic lines of force, and in accordance with the current flowing the torque developed is greater or less, as indicated by the scale, and as is well understood by those skilled in the art.

It will be seen that any external field acting on the instrument tends to strengthen the effect of one magnet and weaken that of the other, and thus causes a compensating action. At the same time no complicated form of magnet is required, but one which is easily made up from bar steel. The working parts of the instrument are extremely few and simple, the framework carrying all the parts except the scale, and the parts $A^2 A^3$ are easily wound and mounted, while the metallic coil carrier A, being in the magnetic field, acts as an effectual damping disk.

What I claim as new, and desire to secure by Letters Patent, is—

1. In an electric measuring instrument, a pair of magnets having their poles reversed with reference to each other, a flat coil or coils rotating between such poles against an opposing force, and an index actuated by the coil.

2. In an electric measuring instrument, a pair of magnets having their poles of unlike sign opposed to one another, a coil or coils carried by a metallic bobbin and rotating between such poles against an opposing force, and an index actuated by the coil.

3. In an electric measuring instrument, a pair of magnets having their poles of unlike sign opposed to one another, a compound coil composed of similar hollow coils laid side by side or in the same plane rotating in the field of the magnets against an opposing force, and an index actuated by the coil.

4. In an electric measuring instrument, a pair of magnets having their poles of unlike signs opposed to one another, a compound coil composed of similar hollow coils laid together in the same plane upon a metallic bobbin and rotating in the field of the magnets against an opposing force, and an index actuated by the coil.

5. A structure for the moving part of an electric measuring instrument composed of a metallic bobbin or coil carrier, in combination with coils wound in the form of semi-circles in the spaces formed in the bobbin, the parts of the coils lying along the diameter of the bar being wound in the same direction.

6. In an electric measuring instrument, a double coil forming the moving part thereof, substantially as described, composed of two smaller coils laid in the same plane, the adjoining parts of the coils being wound in the same direction.

7. The means for conducting current to the actuating coils of an electric measuring instrument herein described, consisting of insulated conductors carried by the axle about which the coils revolve, and strips of silver foil connecting the insulated conductors with the external circuit.

In witness whereof I have hereunto set my hand this 24th day of October, A. D. 1894.

ELIHU THOMSON.

Witnesses:
JOHN W. GIBBONEY,
HENRY O. WESTENDARP.